Patented Jan. 15, 1924.

1,480,807

UNITED STATES PATENT OFFICE.

EDWARD C. HOLTON, OF OLMSTED FALLS, OHIO, AND JAY CLYDE OWENS, OF CHICAGO, ILLINOIS, ASSIGNORS TO THE SHERWIN-WILLIAMS COMPANY, OF CLEVELAND, OHIO, A CORPORATION OF OHIO.

LITHOPONE AND PROCESS OF MAKING THE SAME.

No Drawing.    Application filed May 11, 1922.   Serial No. 560,226.

*To all whom it may concern:*

Be it known that we, EDWARD C. HOLTON and JAY CLYDE OWENS, citizens of the United States, and residents of Olmsted Falls, county of Cuyahoga, State of Ohio, and Chicago, county of Cook, State of Illinois, respectively, have invented certain new and useful Improvements in Lithopone and Processes of Making the Same, of which the following is a specification.

The object of the invention is to provide an improved process of making lithopone which will produce a product having the optimum qualities for paint manufacture, a product which will be uniformly high in opacity, uniformly medium in oil absorption properties, and uniformly low in its tendency to cause thickening of paint on long standing and uniformly low in its tendency to settle out of the vehicle in finished paint and will also not be subject to darkening under the influence of sunlight.

While various processes and expedients have been heretofore suggested for the purpose of overcoming the disadvantageous properties of commercial lithopone, yet in most cases other disadvantages have been introduced which have resulted in a failure to realize the objects sought.

The usual process of making lithopone, which is a mixture of zinc sulfid and barium sulfate, usually in molecular proportions, comprises, as one of its steps, the preparation of a solution of zinc sulfate, substantially free from all contaminating substances, other than sulfate of the alkalis and having a standard definite zinc content. A standard solution of barium sulfid is prepared by the usual method from barytes, i. e., by reduction in suitable furnaces and subsequent lixiviation with water.

These standardized solutions are run into mixing tanks in molecular proportions to exact neutrality, or as near thereto as is practicable, and then a very slight yet definite excess of one solution or the other is added according to the precepts of the particular process employed. This mixture is kept warm and in agitation until the chemical reaction is completed, when it is filter pressed and the press cake dried. The dried cake is then heated in muffle furnaces for a definite period and the hot product, upon being drawn from the furnace, is quenched in water, ground in wet mills, washed, settled, bolted, filtered, dried, and the dried product is then milled, bolted or air-floated, and packed.

Muffling, or its equivalent, is necessary in order to shrink the product and make it sufficiently dense and opaque and stable to atmospheric conditions. However, in the muffle furnaces ordinarily in use today, it is a very difficult matter to maintain the conditions uniform. While it has been generally attempted to exclude air as far as practicable from the muffle, it is well known that the condition maintaining in the muffle is an oxidizing condition of varying intensity. When oxidation is extreme there is a considerable conversion of zinc sulfid to zinc sulfate and zinc oxide. On quenching in water and washing there is a loss of some of this zinc, due to its solution in the wash water, and the resulting lithopone has a lower ratio of zinc sulfid to barium sulfate than the ratio originally planned. Since zinc sulfid is the predominant constituent in giving opacity to the product the lowering of the ratio of zinc sulfid to barium sulfate lowers the opacity. The product also has the disadvantage that it darkens in sunlight.

To obviate these difficulties various methods of treatment with chemical substances, subsequent to the muffling step, have been proposed and while some of these methods partially overcome the difficulties mentioned, they usually complicate the problem by introducing other undesirable features into the resulting product, such as excessive oil absorption, undue thickening in paint mixtures, etc.

The present invention is based upon our discovery that proper control of the muffling step will yield a product with the minimum of objectionable features. In the ordinary process of muffling, when the dried precipitate is placed in the heated muffle sulfur dioxide fumes soon become very noticeable. When the muffle doors are opened, air rushes in and sulfur dioxide fumes escape, the degree of oxidation varying according to the temperature of the muffle, the time allowed for muffling, the time the doors remain open and the ratio of the space occupied by the charge to the gaseous space above it.

Under the ordinary conditions of muffling it is not only impossible to control the degree of oxidation, but the operator cannot even determine the degree of oxidation until some time after the product has left the muffle.

In practicing our invention we prefer to use a furnace of the general design set forth in patent application Serial No. 654,602, filed July 30, 1923, yet good results may be obtained by the use of our invention in any of the usual types of furnaces, including furnaces of the revolving type, provided that, in every case, both the charge and the furnace atmosphere are prepared of such compositions as to fit them for the particular type of furnace used.

In practicing our invention with the ordinary type of muffle furnace the free oxygen in the atmosphere of the muffle is largely or wholly replaced by vapors, which at the temperature of the muffle, will have little or no oxidizing action on the lithopone press cake. This may be accomplished by the introduction into the muffle, at points remote from the doors, of a gentle flow of non-oxidizing vapors and gases. These vapors and gases may consist of water vapor, vapor of hydrocarbon, vapor of sulfur, the gases produced by burning these vapors in heated air, or the gases produced by burning carbon or carbon containing compounds in heated air, or any of these.

Since the press cake contains atmospheric oxygen in its interstices, a small amount of carbon or sulfur, or of material containing carbon or sulfur, is introduced into or mixed with the press cake to function as a deoxidant. This may be added preferably at the time of precipitation of the lithopone, altho it may be added even after the introduction of the press cake into the muffle.

When we speak of introducing sulfur, as above, we do not refer to the sulfur normally present in the molecules such as $ZnS+BaSO_4$, but an extra amount of sulfur in addition to that normally present. This sulfur may be preferably added in the precipitation tub and may be in the form of flowers of sulfur, or milk of sulfur, or finely-ground sulfur, or it may be introduced by a substitution of barium tetrasulfid, or some other polyslfid, for a part of the barium liquor. In any event, the amount of carbon, or sulfur, or mixtures of these, or of other compounds, to be added as a deoxidant, is very small and the optimum amount must be determined for each individual furnace.

According to our invention the muffling step may be considered as consisting of two phases; first, a phase in which the material is heated in an atmosphere in which the oxidizing action is substantially nothing and the shrinking or densifying action is considerable; and second, a phase in which a slight oxidation takes place just before quenching.

In the first phase of the muffling step the oxygen in the interstices of the press cake, is consumed by the deoxidant and since a non-oxidizing atmosphere is maintained in the muffle, there will be no oxidation of the zinc sulfid of the lithopone. During the second phase, which occurs after the muffle has been opened, the heated material is exposed to the atmosphere for a brief interval and during this interval, except for the presence of the deoxidant, there would be considerable oxidation of the zinc sulfid, but because of the presence of the deoxidant, the latter consumes the oxygen of the atmosphere which comes in contact with the material and, as a result, there is practically no oxidation of the zinc sulfid. The amount of deoxidant that is added to the lithopone should be carefully regulated in accordance with the conditions of operation of each particular furnace so that after the quenching step practically all of the deoxidant will have been oxidized and removed either by passing off as a gas prior to quenching, or by being dissolved in the quenching water.

The practice of our invention results in shrinking the lithopone without the development of objectionable quantities of zinc oxide and zinc sulfate, and thus we obtain a product, which, quenched and milled, ordinarily requires no after-treatment with chemicals to eliminate zinc oxide and zinc sulfate. The product which we thus produce, being substantially white, may be readily tinted any color with dyes or colored pigments and while there are many fast dyes which may be used with the necessary mordants we have found that it is preferable to use the fast vat-dyes.

The product consists essentially of a stable, shrunken, zinc sulfid-barium sulfate mixture, substantially free from other zinc and barium compounds, and contains usually less then one-tenth of one percent each of color or dye or free carbon, or any oxide or other element, or other impurity.

Having thus described our invention, what we claim is:

1. The steps of the method of producing ilthopone, having the optimum qualities for paint manufacture, which consists in furnacing the lithopone under non-oxidizing conditions to shrink and condense it and then for a short interval under oxidizing conditions and then quenching.

2. The steps of the method of producing lithopone, having the optimum qualities for paint manufacture, which consists in furnacing a mixture of lithopone and a deoxidant under non-oxidizing conditions and then for a short interval under oxidizing conditions, and then quenching.

3. The steps of the method of producing lithopone, having the optimum qualities for paint manufacture, which consists in furnacing the lithopone in an atmosphere charged with a deoxidant, and then for a short interval under oxidizing conditions and then quenching.

4. The steps of the method of producing lithopone, having the optimum qualities for paint manufacture, which consists in furnacing a mixture of lithopone and a deoxidant in an atmosphere charged with a deoxidant and then for a short interval under oxidizing conditions and then quenching.

In testimony whereof we affix our signatures

EDWARD C. HOLTON.
JAY CLYDE OWENS.